Feb. 26, 1957
E. G. KELLEY
2,782,500
RATCHET PIPE CUTTER
Filed June 25, 1956
2 Sheets-Sheet 2
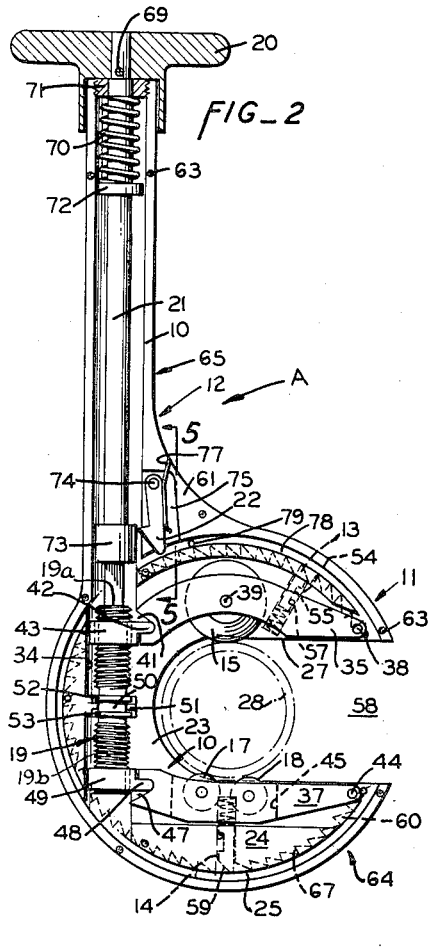
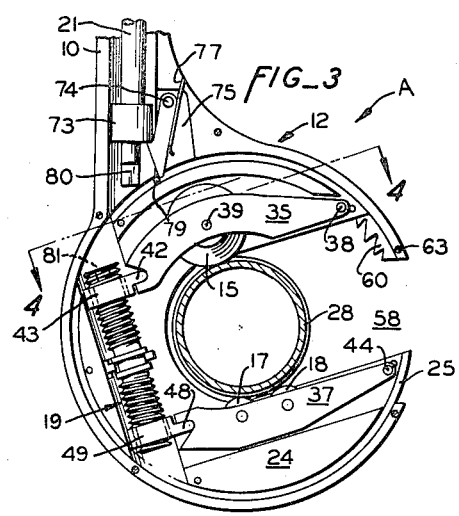
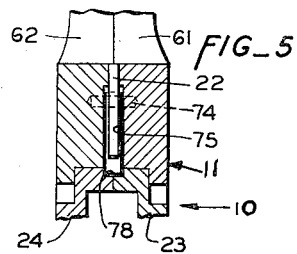
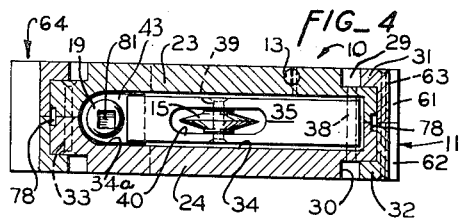
INVENTOR.
ELMER G. KELLEY
BY
ATTORNEYS United States Patent Office 2,782,500
Patented Feb. 26, 1957

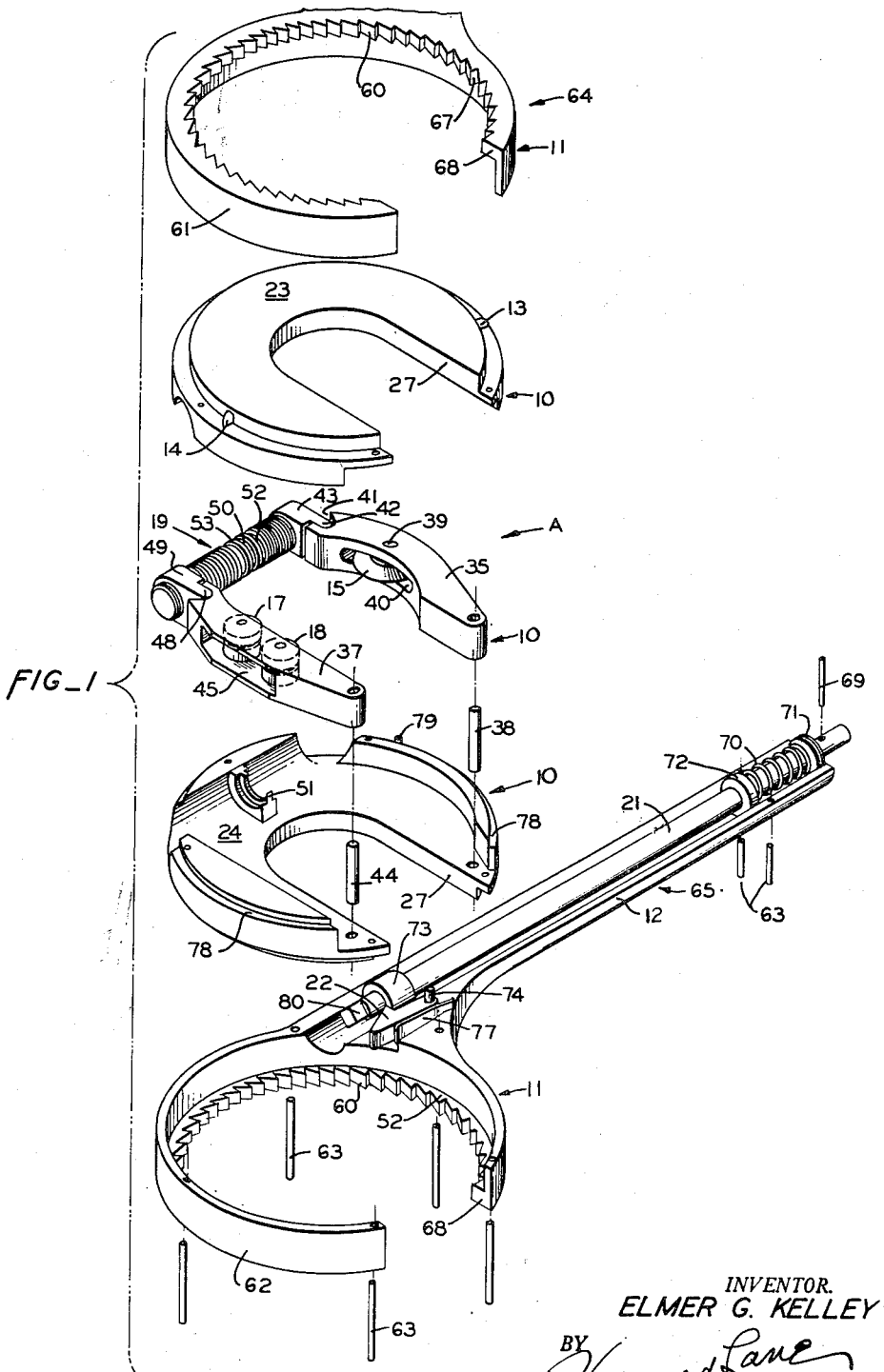

2,782,500

RATCHET PIPE CUTTER

Elmer G. Kelley, San Jose, Calif.

Application June 25, 1956, Serial No. 593,749

3 Claims. (Cl. 30—99)

The present invention relates to a pipe cutter, and pertains more particularly to a ratchet pipe cutter which can be manipulated in close quarters.

This application is a continuation-in-part of application Serial No. 532,468, filed September 6, 1955, which application is about to be abandoned.

It frequently happens in installing pipes used for carrying fluids such as steam and water, that it is necessary, or at least desirable, to cut a pipe which already has been installed or partly installed. On such occasions the pipe to be cut may be located in rather cramped quarters. Previous attempts have been made to provide a ratchet pipe cutter which would work under such circumstances, but most of such cutters either have projections which are apt to cause interference with objects positioned close to the pipe to be cut, or are rather expensive or complicated to manufacture.

The present invention contemplates the provision of an improved and simplified ratchet type pipe cutter.

The invention also provides a pipe cutter having a C-shaped cutter head rotatably mounted within the C-shaped body portion of an operating handle, with means on the handle for simply and positively engaging the cutter head for rotation thereof about a pipe, and for adjustment of a cutting wheel mounted on the cutter head.

The invention also provides a pipe cutter having a ratchet connected cutter head and a handle extension with improved means for providing operative engagement between a cutter wheel adjusting screw and an extension therefor mounted in the handle.

These and other objects and advantages of the invention will be apparent from the following description and the accompanying drawings, wherein Fig. 1 is an exploded perspective view of component parts of a pipe cutter embodying the invention.

Fig. 2 is a longitudinal sectional view through a ratchet pipe cutter showing the parts of Fig. 1 assembled to form a pipe cutter.

Fig. 3 is a view similar to the lower portion of Fig. 2 with the rotatable cutter head partially rotated relative to the operating handle.

Fig. 4 is a sectional view taken along line 4—4 of Fig. 3.

Fig. 5 is a fragmentary sectional view taken along line 5—5 of Fig. 2.

Briefly, the illustrated embodiment A of the invention comprises a C-shaped cutter head 10 rotatably mounted in the correspondingly C-shaped body portion 11 of an operating handle 12. Relative rotative movement between the cutter head 10 and the operating handle 12 is controlled by pawls 13 and 14.

Movement of a cutter wheel 15 toward and away from a pair of presser rollers 17 and 18 is controlled by an adjusting screw 19 journaled in the cutter head 10. A knob 20 mounted on the outer end of a rod controls rotation of the adjusting screw 19. The rod 21 is held in inoperative position by a latch 22 during relative rotative movement between the cutter head 10 and the operating handle 12. The latch 22 is automatically released for spring-pressed re-engagement of the rod 21 with the adjusting screw 19 upon the completion of each revolution of the cutter head relative to the handle.

Referring now to the details of the illustrated embodiment A of the invention, the cutter head consists of a pair of similar, but opposite C-shaped half-portions 23 and 24. Each half portion 23 and 24 has a circular periphery 25 and a notch 27 centrally therein of a size to receive a pipe 28 (Fig. 3) of desired maximum diameter coaxially within the circle defined by the periphery 25. Rabbets 29 and 30 are formed around the exterior edges of the cutter head body portions 23 and 24 to receive retaining flanges 31 and 32 provided on the operating handle 12 to be described in detail later herein.

The cutter head half portions 23 and 24 are hollowed out on their inner sides, and are secured together by screws or rivets 33 to provide a cavity 34 for mounting a cutter wheel support arm 35 and a pressure roller support arm 37 therein. The cutter wheel support arm 35 is pivotally mounted on a pin 38 extending between the two cutter head half portions 23 and 24, and the cutter wheel 15 is journaled on a pin 39 in an opening 40 (Fig. 4) in the arm 35. The opposite end of the cutter wheel support arm 35 from the pivot pin 38 is notched at 41 to fit over a tongue 42 provided on an adjusting nut 43 which is threadedly mounted on the threaded upper portion 19a of the adjusting screw 19. The nut 43 rides in an extension 34a of the cavity 34, and is fitted therein as shown in Fig. 4 to prevent rotation of the nut.

The pressure roller support arm 37 is pivotally mounted on a pin 44 similarly to the cutter support arm 35, and the presser rollers 17 and 18 are journaled in an opening 45 in the arm 37 in a manner generally similar to the mounting of the cutter wheel 15. The presser roller support arm 37 also is provided with a notch 47 in its opposite end from the pivot pin 44 to receive a tongue 48 on a second nut 49 which is threadedly mounted on the lower portion 19b of the adjusting screw 19. The mounting of the lower nut 49 is similar to that of the upper nut 43 with the exception that its threads, and those on the lower portion 19b of the screw 19, are of opposite pitch from the upper nut 43. Thus, when the adjusting screw 19 is turned in one direction, the nuts 43 and 49 will be moved apart, while when the screw 19 is turned in the opposite direction the nuts 43 and 49 will be advanced toward each other, respectively, to retract and advance the cutter wheel 15 and the presser rollers 17 and 18 relative to a pipe 28.

The adjusting screw 19 has an unthreaded central bearing portion 50 which fits between a pair of complementary notched bearing ribs 51 provided one in each half of the cutter head frame. The screw 19 is held against axial displacement by a pair of annular flanges 52 and 53 thereon, one on each end of the bearing portion 50.

The pawls 13 and 14 are mounted for axial slidable movement in radially extending openings 54 provided therefor in each cutter head half portion 23 and 24. Each pawl is notched out along one side thereof at 55 to receive a pin 57 extending transversely through a side of each opening 54 to ride in the notch 55. Each pin 57 prevents rotative displacement of its pawl and also limits movement of the pawl axially within its mounting opening.

A coil spring 58 is mounted in compression between the inner end of each pawl and the bottom of the opening in which it is mounted. Thus each pawl is biased outwardly by its spring 58, but is moved inwardly by the cam action of the sloping rear faces 59 of ratchet teeth 60 provided in the operating handle 12 in a manner which will be made apparent later herein.

The pawls 13 and 14 are separated circumferentially of the cutter head 10 by a distance greater than the width of the notch 27 so that one or the other of the pawls will be in engagement with the ratchet teeth 60 at all times regardless of the relative rotative positions of the operating handle 12 and the cutter head 10.

The operating handle 12, like the cutter head 10, consists of two similar but opposite half portions 61 and 62 secured together in complementary relation by screws or rivets 63. The handle 12 has a generally C-shaped lower end portion 64 and a straight handle portion 65 extending therefrom. Each half of the C-shaped lower handle portion 64 is hollowed out to provide a cavity 67 in which to receive the C-shaped cutter head 10 for rotation therein.

The retaining flanges 31 and 32 as mentioned previously herein ride in the rabbets 29 and 30 of the cutter head 10. The ratchet teeth 60 are cut in each of the retaining flanges 52 and 53, and are formed with radially disposed faces 67 on one side thereof for positive inter-engagement with the pawls 13 and 14. The sloping faces 59 on the other sides of the teeth cam the pawls inwardly to permit relative rotation of the handle and cutter head.

The complementary half portions 61 of the lower handle portion 64 have registering notches 68 therein corresponding to the notches 27 in the C-shaped cutter body portions 23 and 24 so that when the notches 27 and 68 are in register with each other they will conform as shown in Fig. 2 to receive a pipe therein.

The actuating knob 20 for controlling the adjustment of the cutter wheel 15 and presser rollers 17 and 18 is mounted on the outer end of the cutter wheel adjusting rod 21 as by means of a rivet 69. The rod 21 is journaled in the tubular handle extension 65, and is biased axially inwardly by a coil spring 70 which encircles the rod 21 and is held in compression between a nut 71 screwed into the threaded outer end of the tubular handle extension 65 and a collar 72 on the rod 21.

A second, or latch engaging collar 73 is provided on the rod 21 near its lower end as illustrated in Figs. 2 and 3. This lower collar is adapted to be engaged by the spring pressed latch 22 when the rod is pulled upwardly to its position shown in Fig. 3. The latch 22 is pivotally mounted on a pin 74 in a cavity 75 provided by recesses in the handle half portions 61 and 62 and is biased toward the rod by a flat spring 77.

The lower end of the latch 22 rides in a groove 78 provided by a pair of rabbets formed in the inner conforming edges of the cutter head 10 as shown in Fig. 5. A latch release pin 79 (Figs. 1–4) is mounted in the cutter head 10 to extend transversely across the groove 78 in which the free end of the latch 22 rides.

Upon the completion of each revolution of the cutter head 10 relative to the operating handle 12 the pin 79 will swing the latch 22 outwardly clear of the collar 73 and thus will permit the spring 70 to force the rod 21 downwardly so that its squared lower end 80 will be urged into a square recess 81 provided therefor in the outer end of the adjusting screw 19.

In this position rotative movement of the rod 21 by the knob 20 will turn the adjusting screw 19 in one direction to separate the nuts 43 and 49 and thus move the cutter wheel 15 and presser rollers 17 and 18 apart. An opposite turning movement of the knob 20 will force the nuts 43 and 49 toward each other thereby moving the cutter wheel and presser rollers toward each other to force the cutter wheel into cutting engagement with a pipe 28 inserted therebetween.

In using the cutter A the cutter head 10 is turned to bring the notches 27 and 68 into register with each other, in which position the squared lower end 80 of the rod 21 is urged by the spring 70 into the square recess 81 provided therefor in the upper end of the adjusting screw 19.

The knob 20 is turned to separate the cutter wheel 15 from the presser rollers 17 and 18 sufficiently to receive a pipe 28 to be cut therebetween. The pipe is then inserted to the position shown in Fig. 3. The knob 20 then is turned in the opposite direction to cause the cutter wheel 15 to forcibly engage the pipe 28. The knob 20 is then pulled outwardly to raise the latch engaging collar 73 into position to allow the latch 22 to engage and support it as shown in Fig. 3. This holds the squared lower end of the rod clear of the cutter head 10 and permits relative rotation between the cutter head and the operating handle 12.

By then swinging the handle extension 65 alternately back and forth, the ratchet action of the pawls 13 and 14 on the ratchet teeth 60 will cause the cutter head 10 to turn through a complete revolution relative to the operating handle 12.

As the cutter head approaches the point at which it will complete each revolution, the free lower end of the latch 22 will be engaged by the latch release pin 79 in the groove 78, swinging the latch to the right from its position shown in Fig. 3, and thereby releasing the collar 73 to allow the spring 70 to force the rod 21 axially downwardly toward its position in Fig. 2.

Since the knob 20 may have been turned out of a position to register with the socket 81 in the upper end of the adjusting screw 19 during the rotative movement of the cutter head 10, it may be necessary to turn the knob 20 slightly one way or the other as desired to move the squared lower rod end 80 into register with the socket. The knob 20 then may be turned again to force the cutter wheel 15 further into the pipe, ready for another revolution of the cutter head. This process may be repeated until the pipe has been severed.

The invention provides a simple and positively operating ratchet type pipe cutter with a simple and positive method of operation and one which will operate in very cramped quarters.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims:

1. A ratchet pipe cutter comprising a C-shaped cutter head, a pair of arms pivotally mounted in the cutter head for movement toward and away from each other, a cutter wheel mounted on one of said arms, a pair of pressure rollers mounted on the other of said arms, an adjusting screw mounted in the cutter head and operatively connected to the arms for moving said arms alternately toward and away from each other upon opposite rotative movements of the adjusting screw, an operating handle having a C-shaped end portion rotatably supporting the cutter frame therein, ratchet means operating between the cutter head and the handle for limiting relative rotative movement of the cutter head to one direction only, a tubular extension on the handle, a screw adjusting rod mounted for axial and rotative movement in the tubular extension, spring means biasing the rod axially toward the cutter head for operative engagement with the adjusting screw in a predetermined rotative position of the cutter head in the handle, a spring-pressed latch mounted to retain the rod outwardly clear of the cutter head, and a latch releasing element carried by the cutter head for releasing engagement of the latch upon each complete revolution of the cutter head relative to the operating handle, thereby freeing the rod for spring pressed movement toward the adjusting screw.

2. A ratchet pipe cutter comprising a C-shaped cutter head, a pair of arms pivotally mounted in the cutter head, a cutter wheel mounted medially of one of said arms, a pair of pressure rollers mounted on the other of said arms at equal distances from its center for pressing a pipe positioned co-axially of the cutter head against the cutter wheel, an adjusting screw journaled in the cutter head and having threads of opposite pitch in longitudinally separated portions thereof, a nut of corresponding thread threadedly mounted on each threaded portion of the adjusting screw, each nut being operatively connected to one of the arms for moving said arms alternately toward and away form each other upon opposite rotative movements of the adjusting screw, an operating handle having a C-shaped end portion rotatably supporting the cutter frame therein, ratchet means limiting relative rotation between the cutter head and handle to one direction only, a tubular extension on said handle, a screw adjusting rod mounted for rotative movement in the tubular extension, spring means biasing the rod axially toward the cutter head for operative engagement with the adjusting screw, a spring-pressed latch mounted to retain the rod outwardly clear of the cutter head, and a latch releasing element carried by the cutter head for engagement of the latch upon each complete revolution of the cutter head relative to the operating handle, thereby freeing the rod for spring pressed movement toward the adjusting screw.

3. A ratchet pipe cutter comprising a C-shaped cutter head having a gap therein of a size to receive a pipe of predetermined maximum diameter centrally therein, a pair of arms pivotally mounted in the cutter head, a cutter wheel mounted on one of said arms for rolling engagement with one side of a pipe centered in the cutter head, a pair of pressure rollers mounted on the other of said arms for rolling engagement with the opposite side of a pipe centered in the cutter head, adjusting means mounted in the cutter head and operatively connected to the arms for moving said arms alternately toward and away from each other upon selective operation of the adjusting means, an operating handle rotatably supporting the cutter frame in one end thereof and having a gap therein for alignment with the gap in the cutter head, ratchet means limiting relative rotation of the cutter head to the handle to one direction only, a lever arm extending from said handle radially of the axis of cutter head rotation in the handle, an adjusting rod mounted lengthwise of the lever arm for rotative and axial movement relative thereto, said rod being movable axially inwardly in a predetermined rotative position of the cutter head in the handle into operative engagement with the adjusting means, and being movable axially outwardly clear of the cutter head to free the cutter head for rotation relative to the handle.

References Cited in the file of this patent

UNITED STATES PATENTS 882,432    Thomas ---------------- Mar. 17, 1908